United States Patent
Saitou et al.

(10) Patent No.: US 8,396,587 B2
(45) Date of Patent: Mar. 12, 2013

(54) CONVEYANCE CONTROL SYSTEM AND CONVEYANCE CONTROL METHOD

(75) Inventors: Yoshitane Saitou, Kameoka (JP); Kenji Nishikido, Takatsuki (JP)

(73) Assignee: Anywire Corporation, Kyoto (JP)

( * ) Notice: Subject to any disclaimer, the term of this patent is extended or adjusted under 35 U.S.C. 154(b) by 369 days.

(21) Appl. No.: 12/533,177

(22) Filed: Jul. 31, 2009

(65) Prior Publication Data

US 2010/0058098 A1 Mar. 4, 2010

(30) Foreign Application Priority Data

Aug. 28, 2008 (JP) ................................. 2008-220156

(51) Int. Cl.
*G06F 7/00* (2006.01)
*G06F 1/12* (2006.01)
*G06F 13/372* (2006.01)

(52) U.S. Cl. ........ 700/230; 713/400; 370/458; 710/124; 198/781.06

(58) Field of Classification Search .................. 710/110; 700/230; 198/781.06
See application file for complete search history.

(56) References Cited

U.S. PATENT DOCUMENTS

| | | | | |
|---|---|---|---|---|
| 5,838,249 | A * | 11/1998 | Saito et al. ................. | 340/3.55 |
| 6,370,447 | B1 * | 4/2002 | Miyazaki ..................... | 700/230 |
| 6,701,214 | B1 * | 3/2004 | Wielebski et al. ........... | 700/224 |
| 6,711,446 | B2 * | 3/2004 | Kirkpatrick et al. ........ | 700/19 |
| 6,827,202 | B2 * | 12/2004 | Topmiller et al. ......... | 198/781.05 |
| 6,873,882 | B2 * | 3/2005 | Tachibana et al. .......... | 700/230 |
| 7,167,527 | B1 * | 1/2007 | Park et al. ................... | 375/295 |
| 2002/0010527 | A1 * | 1/2002 | Wielebski et al. ........... | 700/230 |
| 2003/0123590 | A1 | 7/2003 | Saitou et al. | |
| 2003/0135299 | A1 * | 7/2003 | Tachibana et al. .......... | 700/213 |
| 2004/0186615 | A1 * | 9/2004 | Wielebski et al. ........... | 700/224 |
| 2005/0054355 | A1 * | 3/2005 | Saitou et al. ................. | 455/463 |
| 2005/0192704 | A1 * | 9/2005 | Wielebski et al. ........... | 700/230 |
| 2008/0221707 | A1 | 9/2008 | Saitou et al. | |
| 2008/0234858 | A1 * | 9/2008 | Dollens ....................... | 700/230 |

FOREIGN PATENT DOCUMENTS

| | | |
|---|---|---|
| EP | 61-096390 | 5/1986 |
| EP | 1326147 | 7/2003 |
| JP | 08-143133 | 6/1996 |
| JP | 11-199030 | 7/1999 |

(Continued)

OTHER PUBLICATIONS

English language Abstract of JP 2003-292141, Oct. 15, 2003.
English language Abstract of JP 2005-47705, Feb. 24, 2005.
An English language abstract of JP61-096390.
An English language abstract of JP61-096390, dated May 15, 1986.

(Continued)

*Primary Examiner* — Ryan Stiglic

(74) *Attorney, Agent, or Firm* — Greenblum & Bernstein, P.L.C.

(57) ABSTRACT

Provided is a conveyance control system in which fast and smooth control is realized without causing a control delay by a processing delay of a control apparatus such as a PLC, and wiring between a control object and a central control unit is omitted. A conveyance control system according to the present invention includes a plurality of data processing slave stations connected through a common transmission line. The data processing slave station obtains information about a predetermined station from monitor/control data about a plurality of stations of the data processing slave station transmitted to the common transmission line, determines and adjusts control/monitoring of an own station and outputs information about an own station to the common transmission line. The information about an own station output to the common transmission line from the data processing slave station is obtained by a different station as part of the monitor/control data to become a control/monitor factor of the different station.

16 Claims, 7 Drawing Sheets

FOREIGN PATENT DOCUMENTS

| | | |
|---|---|---|
| JP | 2002-012315 | 1/2002 |
| JP | 2003-292141 | 10/2003 |
| JP | 2005-47705 | 2/2005 |
| JP | 2008-054264 | 3/2008 |

OTHER PUBLICATIONS

Japan Office action, mail date is Nov. 2, 2011.
Search report from E.P.O., mail date is Dec. 21, 2010.

* cited by examiner

CONVEYANCE CONTROL SYSTEM AND CONVEYANCE CONTROL METHOD

BACKGROUND OF THE INVENTION

1. Field of the Invention

The present invention relates to a conveyance control system and a conveyance control method in which omission of conveyance control wiring, so-called wiring saving, is realized, and optimal control of a conveyance unit is realized.

2. Description of the Related Art

A conventional conveyance control system moves loads at appropriate speed and changes a direction by a branch operation to perform movement in which a collision with other loads is prevented and a regular interval is kept, and performs a classification conveyance or transfer to a predetermined place while accelerating or decelerating from a predetermined speed.

As such a conveyance control system, for example, Patent Document 1 discloses that sensors are installed in a plurality of conveyer units, and sensor inputs are perceived to perform optimal control for a load status.

Also, Patent Document 2 discloses that a stopper which moves as a load is conveyed is used, a sensor which detects movement of a load and a range finder which measures a movement distance of a load from a standby position are provided, and the stopper is positioned at a centering position by using a control means which computes a load width and a movement amount of up to a stopper centering position for positioning a center of a load at a center position based on the measured movement distance.

[Patent Document 1] Japanese Patent Application Laid-Open (JP-A) No. 2003-292141

[Patent Document 2] Japanese Patent Application Laid-Open (JP-A) No. 2005-047705

SUMMARY OF THE INVENTION

However, in the conventional conveyance system, control is performed in such a way that a plurality of control objects, for example, roller controllers, exchange signals with a central control unit such as a programmable logic controller (PLC) or a host system using a sensor signal and a control signal as a transmission signal. Therefore, there is a problem in that software of the central control unit is complicated, and processing delay time occurs while a different complicated control program is executed.

For example, in the system disclosed in Patent Document 1 or Patent Document 2, a sensor signal is transmitted to a host system, and a plurality of control objects operate through determination of the host system.

In this case, in order for a plurality of control objects, for example, roller controllers, to operate in conjunction with each other or perform acceleration or deceleration in conjunction with a roller controller of a previous process or a roller controller of the next process, determination of a central control unit such as a PLC or a host system is always necessary. Therefore, since a central control unit which controls the whole conveyance system performs determination in the process of performing a task, a control delay occurs.

Also, in the conventional conveyance system, there is a problem in that wiring reciprocated between a controlled object such as a sensor or a motor controller and a central control unit such as a PLC or a host system makes wiring complicated and a wiring distance long.

It is an object of the present invention to provide a conveyance control system in which fast and smooth control is realized without causing a control delay by a processing delay of a control apparatus such as a PLC, and wiring between a control object and a central control unit can be omitted.

It is another object of the present invention to perform communication between terminals in which fast and smooth control is realized without causing a control delay and making wiring complicated and wiring long. It is still another object of the present invention to achieve energy saving by optimally controlling smooth acceleration and deceleration and reducing an idling operation.

Claim 1 states a conveyance control system which includes a plurality of data processing slave stations connected through a common transmission line, wherein the data processing slave station obtains information about a predetermined station from monitor/control data about a plurality of stations of the data processing slave station transmitted to the common transmission line, determines and adjusts control/monitoring of an own station and outputs information about an own station to the common transmission line, and the information about an own station output to the common transmission line from the data processing slave station is obtained by a different station as a part of the monitor/control data and becomes a control/monitor factor of the different station.

That is, in the conveyance control system, the data processing slave station appropriately operates with reference to status data of a predetermined data processing slave station without transmitting a monitor signal or a control signal of a conveyance control system to a central control unit such as a PLC and waiting a response of the central control unit. Even though signal wirings are not individually wired up to the central control unit, an operation is performed.

The common transmission line may be connected to the data processing slave stations through two transmission lines when electric power is superimposed onto a control/monitor signal. In this case, wiring can be easily simplified, and the conveyance control system can be controlled through very simple wiring by superimposing monitor data of a sensor or control data of an actuator onto the common transmission line.

Claim 2 states the conveyance control system of claim 1, wherein the monitor/control data is transmitted subsequent to a start signal which represents a start of transmission, and the data processing slave station updates a sequential address count by a clock signal, starting from the start signal, based on the start signal and the clock signal which configures the control/monitor data and performs transmission synchronization.

That is, the number of clocks subsequent to a start signal generated by a mediation station is counted, and an address and a count value of an own station determined by an address setting means of an own station are combined, and so data for an own station can be recognized by each data processing slave station.

Claim 3 states the conveyance control system of claim 1 or 2, wherein a signal of the control/monitor data has an output period during which data is output from a mediation station or a master station to the data processing slave station and an input period during which data is input from the data processing slave station to the mediation station.

For example, since a monitor signal can be transmitted to a mediation station and all data processing slave stations during one clock cycle by signal doubling, for example, by transmitting a monitor signal during an off period of ON/OFF of a pulse signal through a current signal, smooth control can be realized without waiting processing of a control program of a central control unit.

Claim 4 states the conveyance control system of claim 1, 2 or 3, wherein a mediation station or a master station which has a memory area is connected to the common transmission line, and information output from the data processing slave station is stored in the memory area by overwriting after different monitor/control data previously stored in the memory area is output when its output is completed and transmitted to the common transmission line as new monitor/control data.

Claim 5 states the conveyance control system of claim 1, 2, 3, or 4, wherein the data processing slave station controls conveyance speed, a conveyance direction, and a branch direction of a processing in which an own station performs control with respect to conveyance speed of a predetermined process.

That is, each data processing slave station stores control data or status information of a predetermined process and has a function of determining and controlling an appropriate method of starting idling or accelerating/decelerating with respect to control of an own station.

Claim 6 states the conveyance control system of any one of claims 1 to 5, wherein the data processing slave station detects abnormality in a predetermined process and controls conveyance speed, a conveyance direction, and a branch direction of a processing in which an own station performs control.

The predetermined process is a process which is previously determined for each processing and different from a corresponding processing. For example, the predetermined process may be a process (a pre-process) immediately before a process in which an own station performs control and a process (a post-process) immediately after the process. In this case, for example, idling can start at a speed of an own process with reference to speed data, an overload signal, a driver malfunction signal, or a motor malfunction signal of the pre-process, or processing can be performed with reference to an overload signal, a driver malfunction signal, or a motor malfunction signal when abnormality is detected, or when accelerated conveyance is performed from the pre-process toward the next process, an initial speed of an own process is determined with reference to a final setting speed of the pre-process to perform idling, and a speed is accelerated toward an initial speed of the next process together with a load, so that smooth acceleration can be performed. In a deceleration process, a reverse process is performed.

In the case in which a post-process subsequent to a process in which an own station performs control is the predetermined process, when an error such as a motor malfunction and a motor driver malfunction occurs in any of subsequent processes, control of stopping or immediately stopping conveyance objects conveyed before a process in which an own station performs control is performed based on data of a different data processing slave station.

Claim 7 states a conveyance control method which includes setting an address corresponding to each conveyance process and transmitting control/monitor data which includes a plurality of control data and monitor data about each process subsequent to a start signal which represents a start of transmission; in a spot in which each processing is performed, updating a sequential address count by a clock signal, starting from the start signal, based on the start signal and the clock signal which configures the control/monitor data to perform transmission synchronization and obtaining information about a different processing from the monitor/control data; and determining and adjusting control/monitoring of each process by information about the different process, and, in a spot in which each processing is performed, outputting information about each process as part of the monitor/control data.

DESCRIPTION OF THE PREFERRED EMBODIMENTS

Figure 1:
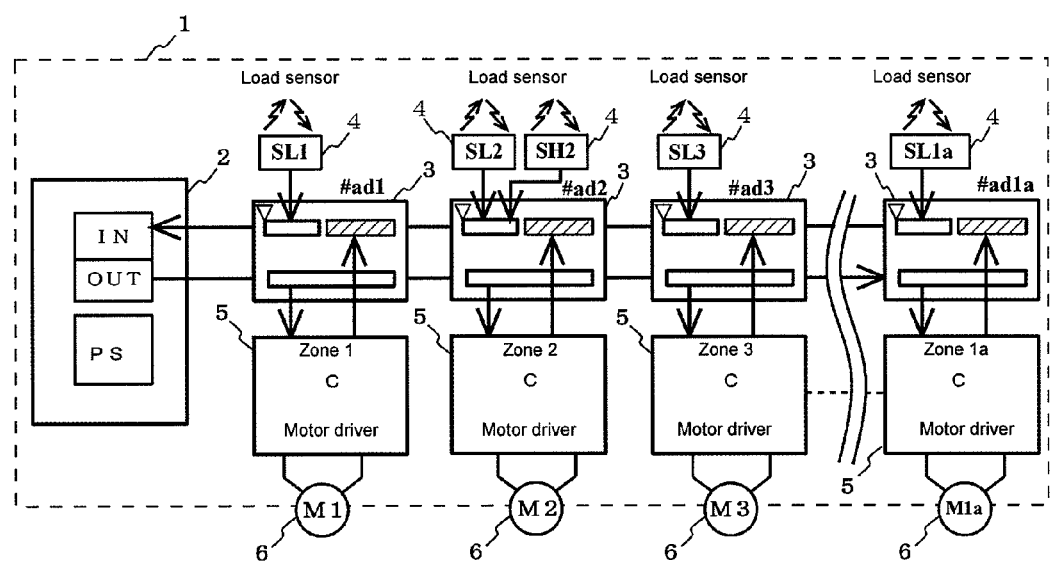
FIG. 1 is a view illustrating a configuration of a conveyance control system according to an embodiment of the present invention.
Figure 2:
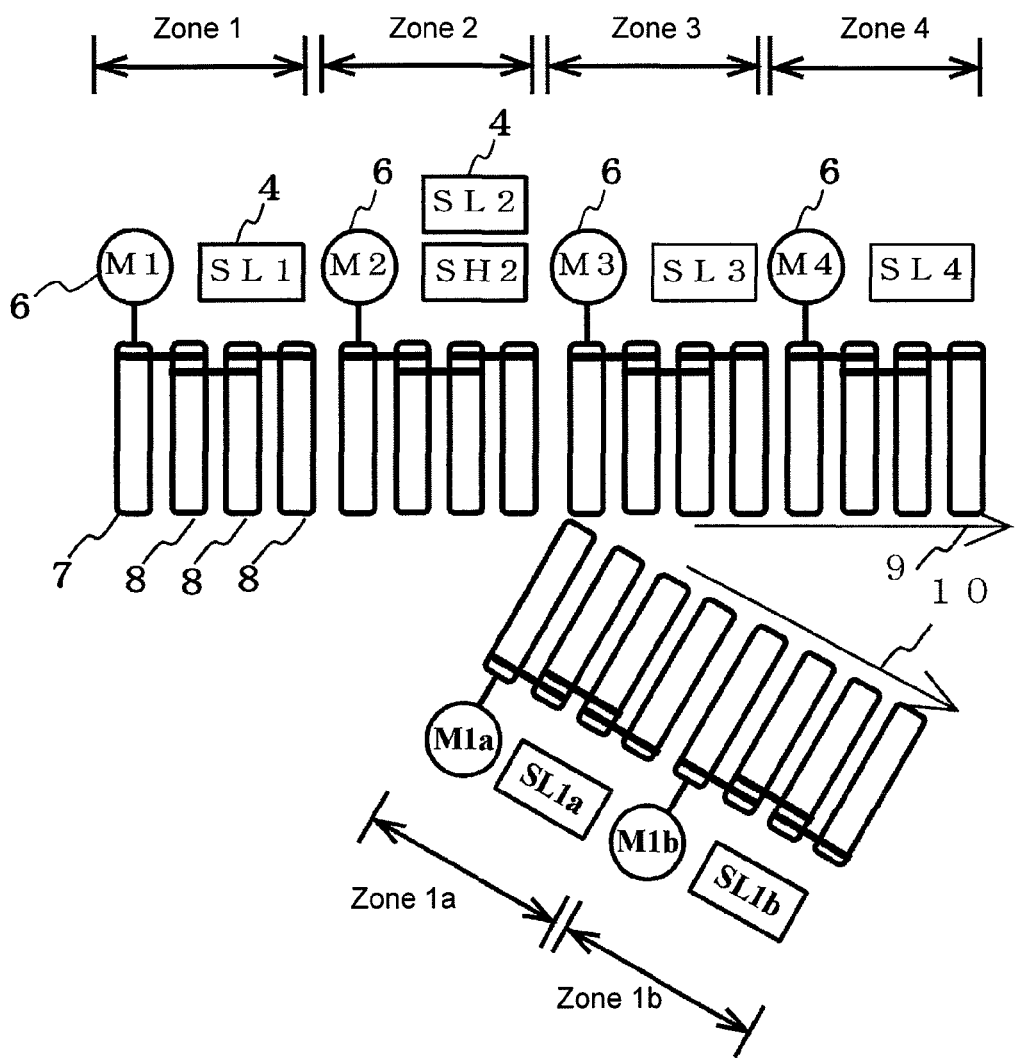
FIG. 2 is a schematic diagram of a roller conveyer-type conveyance system in which zones are defined.
Figure 3:
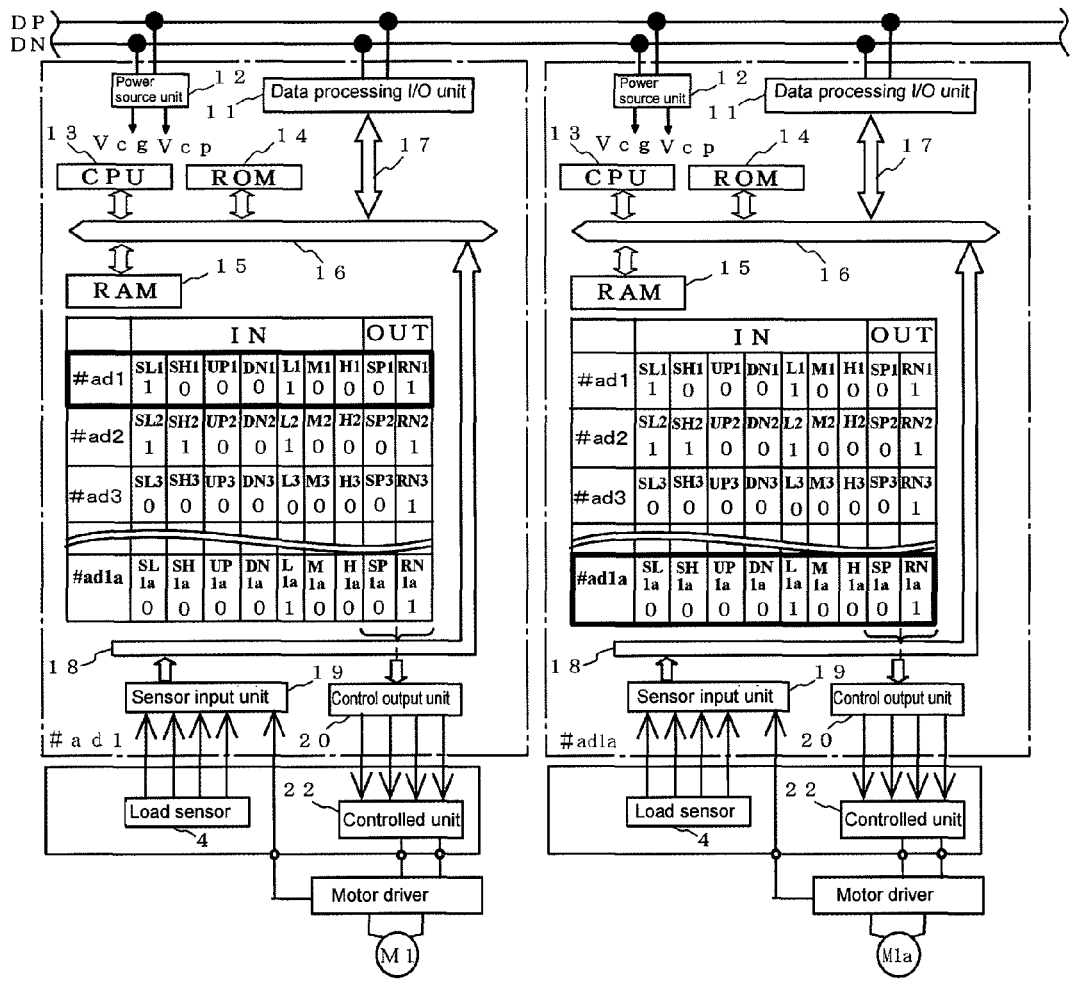
FIG. 3 is a block diagram illustrating a connection among the data processing slave station inside, a transmission system and a driving unit.
Figure 4:
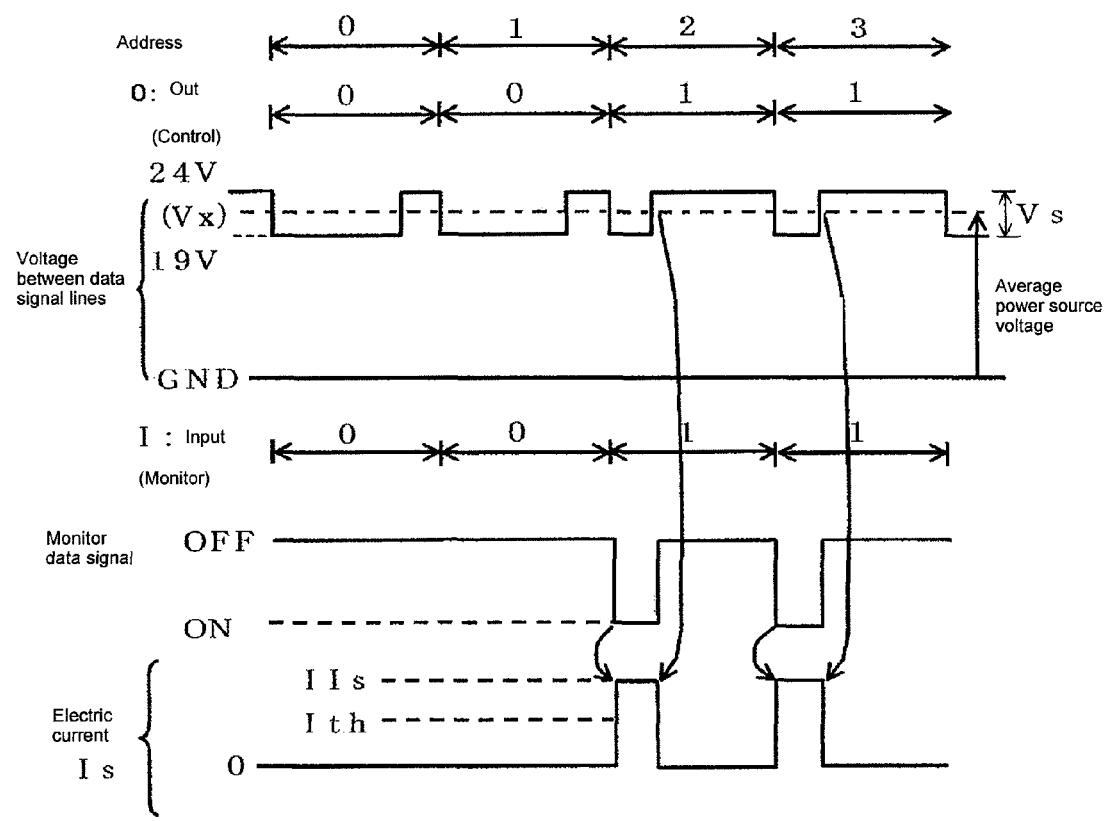
FIG. 4 is a time chart of a transmission signal.
Figure 5A:
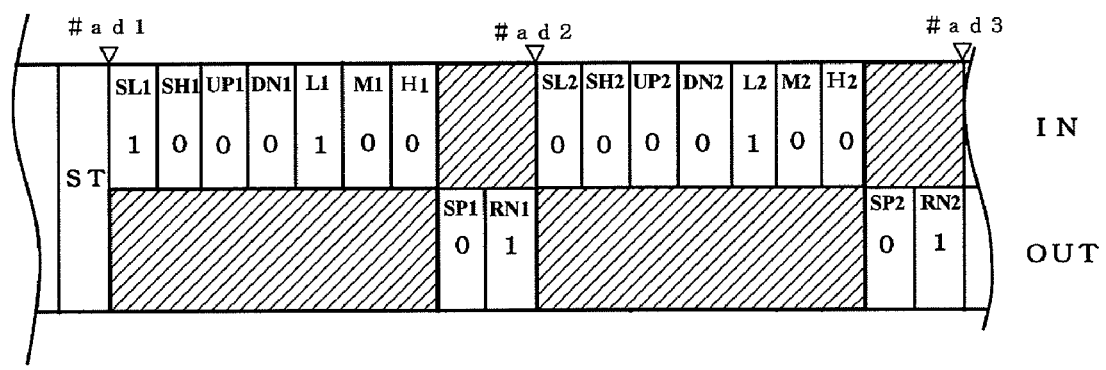
FIGS. 5A to 5C are arrangement views illustrating transmission signals.
Figure 5B:
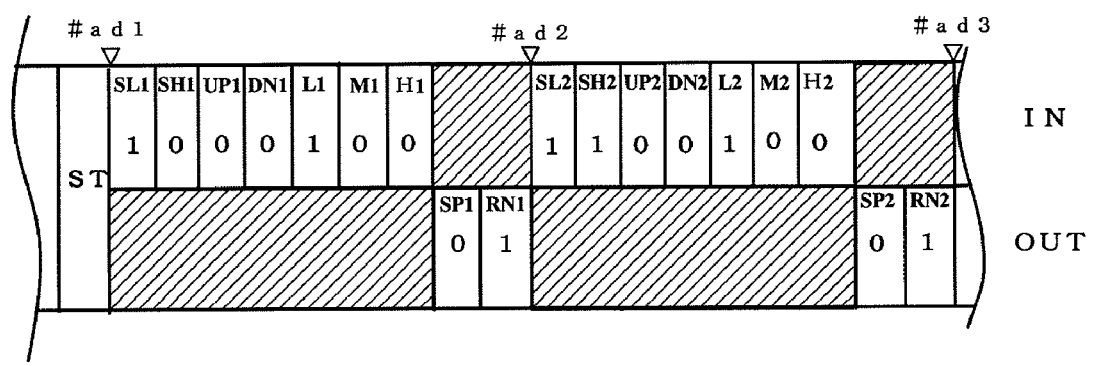
Figure 5C:
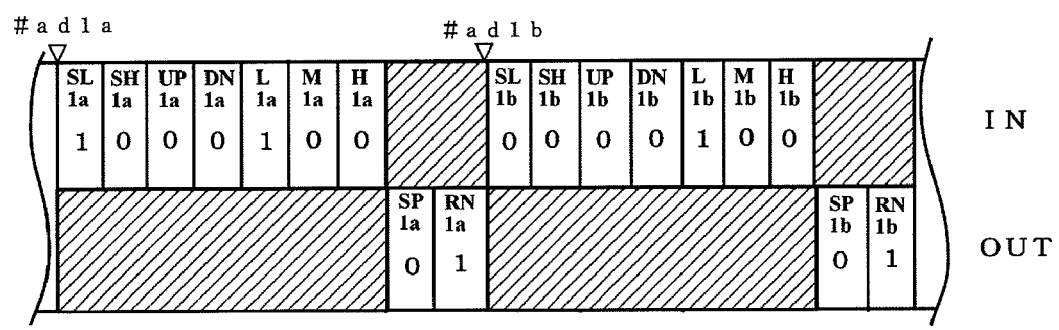

Hereinafter, embodiments of the present invention will be described with reference to FIGS. 1 to 5C. FIG. 1 is a view illustrating a configuration of a conveyance control system according to an embodiment of the present invention, FIG. 2 is a schematic diagram of a roller conveyer-type conveyance system in which zones are defined, FIG. 3 is a block diagram illustrating a connection among the data processing slave station inside, a transmission system and a driving unit, and FIG. 4 is a time chart of a transmission signal, and FIGS. 5A to 5C are arrangements view illustrating transmission signals.

As shown in FIG. 1, a conveyance system 1 according to this embodiment includes a plurality of conveyance units which include a motor driving roller and a plurality of interlocking rollers which interlock with the motor driving roller through a power transmission means. Also, a mediation station 2 which generates a start signal and an end signal of a transmission signal and a clock signal subsequent thereto, a plurality of data processing slave stations 3 which are connected to transmission lines DP and DN, a load sensor 4, a motor driver 5, and a driving motor 6 are provided.

The data processing slave station 3 is connected to the common transmission lines DP and DN through a data processing slave station I/O unit 11, and is connected to a CPU 13 and a RAM 15 through an I/O bus 17 and a local bus 16 to exchange signal data. That is, the data processing slave station 3 obtains information about a predetermined station from monitor/control data about a plurality of stations of the data processing slave station 3 which is transmitted to the transmission lines DP and DN, and outputs information about an own station to the transmission lines DP and DN.

The CPU 13 determines control/monitoring of an own station based on obtained information about a predetermined station through a control program stored in a ROM 14. Control contents are handled by the CPU 13 according to a control program stored in the ROM 14 as output data OUT of the RAM 15, and output to the motor driver 5 which will be described alter from a control output unit 20 through an I/O bus 18. The control contents are also output to the transmission lines DP and DN as information about an own station by the data processing slave station I/O unit 11 through the local bus 16 and the I/O bus 17.

The CPU 13 obtains a monitor signal from the load sensor 4 connected to a sensor input 19 and outputs the monitor signal to the transmission lines DP and DN through the data processing slave station I/O unit 11. The sensor input unit 19 exchanges signal data with the CPU 13 and the RAM 15 through the I/O bus 18 and the local bus 16. The sensor input unit 19 also obtains speed data, an overload signal, a driver malfunction signal, and a motor malfunction signal of the motor driver 5 and outputs the speed data, the overload signal, the driver malfunction signal, and the motor malfunction signal to the transmission lines DP and DN as information about an own station like the monitor signal.

The mediation station 2 generates a start signal and a clock signal subsequent thereto and outputs the start signal and the clock signal to the transmission lines DP and DN. The data processing slave station 3 counts the number of clocks to perceive which data value belongs to which data processing slave station. The transmission signal will be described in detail later.

Next, a detailed operation of the system will be described. An address number is imparted to each of the plurality of data processing slave stations 3, and in an example of FIG. 1, the data processing slave station 3 of an address number 1 (#ad1) is connected to the motor driver 5 of a zone 1. The data processing slave station 3 is connected to the load sensor 4 including a reflective-type sensor SL1, and obtains an input signal of the load sensor 4 and speed data, an overload signal, a driver malfunction signal, and a motor malfunction signal of the motor driver 5 from the sensor input unit 19 and outputs them to the transmission lines DP and DN as described above. A conveyance speed instruction signal of the zone 1 according to determination based on information of a different station is output from the control output unit 20 to the motor driver 5. The motor driver 5 sets a rotation speed of the driving motor 6 by an instruction signal from the control output unit 20 of the data processing slave station 3 and transfers a conveyed object on the zone 1 to the next zone 2.

The data processing slave station 3 of the address number 2 (#ad2) is identical to that in the zone 1 in obtaining a monitor signal and outputting a control signal, but a load sensor 4 includes a reflective-type sensor SL2 which is identical to the sensor SL1 is provided and a reflective-type load height sensor SH2. The reflective-type load height sensor SH2 is a sensor which detects a conveyed object having a height equal to or more than a predetermined height. An input signal of the load sensor 4 which includes both a signal of the sensor SL2 and a signal of the sensor SH2 is output to the transmission lines DP and DN as in the data processing slave station 3 of the #ad1.

For example, a signal perceived in the load height sensor SH2, that is, a load height, may be used as a control input for branching a conveyance direction of a load, performing a classification conveyance thereof or dividing/collecting loads.

In an embodiment of FIG. 2, the data processing slave station 3 of an address number 1a (#ad1a) installed in a zone 1a of a path changing direction from a conveyance direction which is an advancing direction takes over a conveyed object from the zone 1 and operates the motor driver 5 which operates a transmission system of the zone 1a when a monitor signal of the load height sensor SH2 is reflected in control/monitor data and the information is obtained.

FIG. 3 illustrates data stored in the data processing slave station 3 when a conveyed object with a high height (hereinafter, a "conveyed object H") is conveyed up to the zone 2. In FIG. 3, among information obtained from the transmission lines DP and DN, "IN" denotes each zone status, and "OUT" denotes output information for the control output unit 20. "OUT" information is used to control whether to operate the whole system and does not control a detailed state of each zone. RN is "1" when an operation is possible, and SP is "1" when an operation is impossible. In this embodiment, since all zones are in an operatable state, all RNs in "OUT" information are "1". Information indicated by a bold frame is information of an own station.

First, in #ad1, since a different conveyed object (hereinafter, a "conveyed object N") subsequent to the conveyed object H which is transferred to the zone 2 is detected, SL1 of IN becomes "1" (detected). Data representing that a speed of the motor driver 5 is slow, that is, L1 of IN, becomes "1". Also, since the zone is in an operatable state, RN1 of OUT becomes "1".

In #ad2, since it is in a state which detects the conveyed object H through by the sensor SL1 and is ready to take over it and the motor driver 5 is driven and is in a low speed operation state, L2 of IN becomes "1". Also, since the conveyed object H is detected, SL2 and SH2 become "1", respectively. In #ad3, since there is a time until the conveyed object is conveyed, the motor driver 5 is in a stop state, and all IN information is "0".

Also, in #ad1a, since SH2 of #ad2 is "1", in order to take over the conveyed object H, the motor driver 5 is driven and so in a low speed operation state, so that L1a of IN becomes "1".

Meanwhile, when the load height sensor SH2 does not detect a load, that is, when the conveyed object does not have a height equal to or more than a predetermined height, the data processing slave station 3 of the address number 3 (#ad3) installed in a zone 3 in an advance direction obtains the information and operates a motor driver 5 of a driving motor M3 to continuously convey the conveyed object in an advance direction. Also, in FIG. 3, SH1 and SH3 are input portions which are prepared for the same sensor signal even with respect to addresses which do not have a load height sensor, and so a load height sensor can be easily installed. However, in this embodiment, a signal input portion corresponding to a load height sensor is "0".

A first motor M1 is a driving motor 7 of the zone 1 and configures the zone 1 together with three interlocking rollers 8 which interlock with the driving motor 7. Ends of the interlocking rollers serve as pulleys for transmitting power through a belt, and the driving motor and the interlocking roller conveys a load on the rollers while transferring torque. Also, opposite ends of the interlocking rollers serve as pulleys for transmitting power through a belt, and transmit power to the subsequent interlocking rollers through a belt. Similarly, a second motor M2 configures the zone 2 together with a driving motor 7 of the zone 2 and three interlocking rollers 8. Also, a third motor M3 and a fourth motor M4 form zones of an advancing direction and are in charge of conveyance of an advancing movement 9 direction. A load sensor SL2-1 in a zone of a branch direction 10 and a load sensor SL2-2 in a subsequent zone serve as detection sensors which detect a load status. When the data processing slave station 3 of the branch direction 10 determines a start and speed change, a branch operation conveyance is performed.

As illustrated in FIG. 3, a speed control signal is transmitted from the controlled unit 22 to the motor driver 5 to operate the driving motor 6. Also, the motor driver transmits an error signal occurring when an overload occurs in the driving motor 6 or a malfunction occurs in a driver circuit to the sensor input unit 19. The information is transmitted to the transmission lines DP and DN, so that line control is performed when a malfunction or an error is detected. For example, the load sensor 4 of #ad1 obtains a monitor signal from the sensor input unit 19, and stores monitor data in a monitor signal area of an address 1 of the RAM 15 through the I/O bus 18 under control of the CPU 13. Also, the CPU 13 performs a logical operation of control output data stored in the RAM 15 using a program stored in the ROM 14 and then transmits a signal to the control output unit 20 through the local bus 16 and the I/O bus 18. As the logical operation, determination for acceleration or deceleration may be performed, so that a speed of a previous process can be maintained or smoothly accelerated or decelerated. The controlled unit 22 outputs a control signal for performing control for acceleration, deceleration, constant speed, stop, forward movement, or backward movement to the motor driver 5. The driving motor is a servomotor or an AC motor, and performs an operation of acceleration, deceleration, constant speed, stop, forward movement, or backward movement. Typically, a conveyance commonly means a transfer of an advancing direction, but, for example, in the case of outdoor conveyance facilities or in the case of loads which are required to maintain a cleaning level or a temperature under a certain condition, when a malfunction occurs in a process which is currently being performed, loads are moved back to a standby place by backward movement. Due to this operation, a low temperature, a cleaning level and humidity of loads can be maintained in a prescribed state.

FIG. 4 is a time chart of a transmission signal of the conveyance control system 1.

FIG. 4 illustrates a case in which data values of addresses 0 to 3 of a control/monitor data signal output from the mediation station 1 are "0101", and an input from the sensor unit 7 to which addresses 0 to 3 are "0011". Here, the address is not an address imparted to the data processing slave station 3 but to indicate a position in a monitor/control data signal.

In a serial pulse voltage signal of this embodiment, one cycle (t0) of a clock CK, that is, each address is divided into at least an input period (i) and an output period (o) subsequent thereto. In FIG. 4, in the addresses 0 and 2 in which a data value is "0", a first ¾ cycle which becomes a low level is an input period, and a final ¼ cycle is an output period. Also, in the addresses 1 and 3 in which a data value is "1", a first ¼ cycle which becomes a low level is an input period, and a final ¾ cycle is an output period. During an input period, a monitor data signal which includes a current signal Is is superimposed, and a mediation station input unit 18 extracts the superimposed monitor data signal. Meanwhile, during an output period, a control signal which is pulse width modulated is superimposed. A mediation station output unit 15 obtains a monitor signal which is obtained during previous output as a control signal, and superimposes a control data signal onto a serial pulse voltage signal and outputs the superimposed signal to the transmission lines DP and DN during the output period.

As can be understood from the above description, the control/monitor signal transmission system corresponds an input signal (a monitor signal form the sensor unit 7) and an output signal (a control signal for the motor driver 5 in a 1:1 correspondence method and transmits them as described above. Therefore, a simple configuration in which a control unit and a master station of a conventional art are omitted is realized, and the maintenance is easy, and the cost is low. For each input/output address of a transmission cycle, an output signal including a pulse width modulation signal is controlled by an input signal including an electric current signal. Therefore, virtual two-way transmission (actually, as will be described later, a transmission moment is not bi-directional) of an input signal and an output signal can be performed, and a power line can be omitted.

Also, an in this example, by using an electric current signal as a monitor signal, and a voltage signal which is modulated in pulse width as a control signal (a combination of a current modulation monitor signal and a pulse width modulation control signal), a transmission control system of high reliability can be realized in manufacturing factories under an unfavorable condition in which a voltage noise is large.

Also, electric power used by the data processing slave station 3 is supplied (Vcp and Vcg) through a power source unit 12 from the common transmission lines DP and DN. A method of superimposing electric power onto a transmission line is a wiring omission, so-called wiring saving technology and can reduce wiring.

In this embodiment, a control signal includes a pulse voltage of a power source voltage Vx, that is, 24V level and a pulse voltage of "a low level of high potential" which is a level smaller (in absolute value) than the power source voltage and larger (in absolute value) than a high level signal of a different circuit portion, that is, 19V level. Therefore, it is sufficiently larger than a CMOS high level signal 5V of a different circuit portion (for example, a CMOS logic circuit portion). Since an electric potential difference Vs of a clock CK, that is, between a high level and a low level of a pulse voltage, is 5V, by using a threshold value as an intermediate value thereof (21.5V when a DN signal line is used as a reference level), they can be sufficiently discriminated. That is, an electric potential difference Vs is equal to a CMOS logic amplitude of a different circuit portion (for example, a CMOS logic circuit portion). Therefore, a serial pulse voltage signal may be regarded as a signal obtained by level-shifting a clock of the electric potential difference Vs "as is" and modulating a pulse width thereof according to a control data signal. Meanwhile, according to a clock which is modulated in pulse width and is limited in amplitude at high potential, an average power source voltage realized by transmitted average power becomes too high, that is, +21.5V which is about a center value of a corresponding amplitude as indicated by a dashed line in FIG. 4. Therefore, even though, for example, a power line P is omitted, power capacity enough for operating each of a plurality of data processing slave stations 3 can be transmitted.

FIGS. 5A to 5C are arrangement views illustrating transmission signals of the conveyance control system 1.

FIGS. 5A and 5B illustrate arrangements of transmission signals corresponding to the zones 1 and 2, and FIG. 5C illustrates an arrangement of transmission signals corresponding to the zones 1a and 1b. An upper portion of the drawing denotes an input IN which represents each zone status, and a lower portion thereof denotes an output signal OUT which controls whether to operate. In this embodiment, since all of zones are in an operatable state, OUT information is "1" in all RNs.

Transmission signals illustrated in FIGS. 5A to 5C start from respective start signals ST, and input/output signals of from an address 1 (#ad1) to an address 1b (#ad1b) are continuing as one cycle. FIG. 5A illustrates a signal of a state in which the conveyed object H is in the zone 1, and FIGS. 5B and 5C illustrate signals of states in which the conveyed object H is transferred to the zone 2.

In this example, first, the data processing slave station 3 of #ad1 conveys the conveyed object H by a low speed operation. At this time, the conveyed object H is not transferred to the zone 2 yet, and in an input signal of FIG. 5A, SL1 which represents a load sensor of #ad1 and L1 which represents a low speed are "1", and SL2 which represents a load sensor of #ad2 and SH2 are "0". However, since the zone 2 detects the conveyed object H through the sensor SL1 and is ready to take over and so a low speed operation is performed in order to take over a conveyance, L2 which represents a low speed becomes "1".

When the conveyed object H is conveyed up to the zone 2, since the conveyed object H is detected there, in FIG. 5B, SL2 and SH2 of #ad2 become "1". At this time, in the zone 1, since a different conveyed object N is detected subsequent to the conveyed object H, SL1 of #ad1 becomes "1". Also, the zones 1*a* and 1*b* are in a low speed operation state since SH2 of #ad2 is "1", and in FIG. 5C, L1*a* of #ad1*a* and L1*b* of #ad1*b* become "1".

In this embodiment, a serial pulse voltage signal is divided into an input period and an output period subsequent thereto. During an input period, an input to the data processing station 3 is performed, and during an output period, an output from a mediation station 2 is performed, so that signal arrangements illustrated in FIGS. 5A to 5C are formed. However, in the conveyance control system of the present invention, a master station which has an operation processing function which is more advanced than a mediation station 2 may be used, and in this case, a signal arrangement accords with a transmission method of a master station.

Meanwhile, a mediation station 2 may have an input memory holding area for storing input data of the whole system and an output memory holding area for storing output data of the whole system according to a usage situation. Monitor data of a monitor signal output from the data processing slave station 3 is stored in the input memory retaining area. Stored data is written (stored by overwriting) in the output memory holding area for every one clock or in every one cycle (for each block) of transmission data. After writing to the output memory holding area is completed, data of the input memory holding area is rewritten by new input data. By wedging data written in the output memory holding area between a start signal and a transmission end signal END and transmitting it to the transmission lines DP and DN, basic conveyance control can be easily performed without depending on a central control unit such as a PLC.

INDUSTRIAL APPLICABILITY

According to the present invention, control of a conveyance system in which control between conveyance zones is smooth and energy is saved can be performed without a control delay by a processing delay of a central control unit such as a PLC.

EFFECT OF THE INVENTION

According to the present invention, a system in which basic conveyance control can be easily performed without depending on a central control unit such as a PLC can be provided. Also, since a lot of wirings are not required between a sensor or an actuator and a control apparatus such as a PLC, wiring can be easily simplified. In addition, there are advantages that smooth acceleration and deceleration can be optimally controlled by appropriate determination control of each data processing slave station, an idling operation can be reduced, and control of easily realizing a smooth energy saving operation can be performed.

What is claimed is:

1. A conveyance control system, comprising:
a plurality of data processing slave stations connected through a common transmission line,
wherein a first data processing slave station of the plurality of data processing slave stations obtains information about a predetermined station from monitor/control data about the plurality of data processing slave stations transmitted to the common transmission line, determines and adjusts control/monitoring of the first data processing slave station, and outputs information about the first data processing slave station to the common transmission line,
a frame of the monitor/control data transmitted on the common transmission line includes a series of input/output signals of a plurality of addresses subsequent to a start signal, which represents a start of transmission, and continuing to a next start signal, each address indicating a position in the monitor/control data frame, and is divided into at least an input period and an output period subsequent to the input period, data being output from a mediation station or a master station to the first data processing slave station during the output period, data being input from the first data processing slave station to the mediation station or the master station during the input period, and
the information about the first data processing slave station output to the common transmission line from the first data processing slave station is obtained by a different data processing slave station, as a part of the monitor/control data, and becomes a control/monitor factor of the different data processing slave station,
wherein the plurality of data processing slave stations obtain information in the monitor/control data frame synchronously from the common data transmission line without being transmitted through the master station or the mediation station,
wherein the common transmission line comprises a common conductor that is configured to transmit the monitor/control data and to transmit electric power, and
wherein each of the plurality of data processing slave stations includes a RAM storing the monitor/control data about the plurality of data processing slave stations.

2. The conveyance control system of claim 1, wherein each data processing slave station updates a sequential address count by a clock signal, starting from the start signal, based on the start signal and the clock signal, which configures the monitor/control data, and performs transmission synchronization.

3. The conveyance control system of claim 1, wherein the mediation station or the master station has a memory area connected to the common transmission line, and information output from the first data processing slave station is stored in the memory area by overwriting, after different monitor/control data, which has been stored in the memory area previous to the output of the information from the first data processing slave station, is output, and is transmitted to the common transmission line as new monitor/control data.

4. The conveyance control system of claim 1, wherein the first data processing slave station controls a conveyance speed, a conveyance direction, and a branch direction of processing in which the first data processing slave station performs control with respect to conveyance speed of predetermined processing.

5. The conveyance control system of claim 1, wherein the first data processing slave station detects abnormality in a predetermined processing and controls a conveyance speed, a conveyance direction, and a branch direction of processing in which the first data processing slave station performs control.

6. The conveyance control system according to claim 1, wherein the monitor/control data includes monitor data output from a sensor provided in correspondence to each of the plurality of data processing slave stations during the input period, and control data to drive a motor driver provided in correspondence to each of the plurality of data processing slave stations during the output period.

7. The conveyance control system according to claim 6, wherein
   each of the plurality of data processing slave stations includes a ROM storing a program,
   each of the plurality of data processing slave stations stores the monitor data, which is obtained from the sensor provided in correspondence to the data processing slave station, into a monitor signal area for the data processing slave station in the RAM, and
   each of the plurality of data processing slave stations performs a logical operation of the control data of the monitor/control data stored in the RAM, using the program in the ROM, and transmits a signal to the motor driver to control the motor driver.

8. The conveyance control system according to claim 6, wherein the monitor data stored in the RAM includes states of sensors provided to the plurality of data processing slave stations, and
   the control data stored in the RAM at least indicates whether or not operations of the motor drivers provided to the plurality of data processing slave stations are possible.

9. The conveyance control system according to claim 1, wherein the output period and the input period of each address is within a single clock cycle.

10. The conveyance control system according to claim 1, wherein the common conductor comprises a single common conductor.

11. A conveyance control method for controlling a plurality of data processing slave stations, comprising:
   setting a processing address corresponding to each conveyance processing, and transmitting control/monitor data, through a common transmission line, the control/monitor data including a plurality of control data and monitor data about each processing, subsequent to a start signal, which represents a start of transmission, the common transmission line comprising a common conductor that transmits the control/monitor data and electric power;
   in a spot in which each processing is performed, updating a sequential address count by a clock signal, starting from the start signal, based on the start signal and the clock signal, which configures the control/monitor data, to perform transmission synchronization, and obtaining information about a different processing from the control/monitor data, wherein a frame of the control/monitor data transmitted on the common transmission line includes a series of input/output signals for a plurality of addresses subsequent to the start signal and continuing to a next start signal, each of the plurality of addresses indicating a position in the control/monitor data frame and is divided into at least an input period and an output period subsequent to the input period, data being output from a mediation station or a master station to a data processing slave station in the output period, data being input from the data processing slave station to the mediation station or the master station in the input period; and
   determining and adjusting control/monitoring of each processing by information about the different processing, and, in a spot in which each processing is performed, outputting information about each processing as a part of the control/monitor data,
   wherein the plurality of data processing slave stations obtain information in the control/monitor data frame synchronously from the common data transmission line without being transmitted through the master station or the mediation station, and
   wherein each of the plurality of data processing slave stations includes a RAM storing the control/monitor data about the plurality of data processing slave stations.

12. The conveyance control method according to claim 11, wherein the control/monitor data includes the monitor data output from a sensor provided in correspondence to each of the plurality of data processing slave stations during the input period, and the control data to drive a motor driver provided in correspondence to each of the plurality of data processing slave stations during the output period.

13. The conveyance control method according to claim 11, wherein the output period and the input period of each address is within a single clock cycle.

14. The conveyance control method according to claim 12, further comprising:
   storing the monitor data, which is obtained from the sensor provided in correspondence to the data processing slave station, into a monitor signal area for the data processing slave station in the RAM, and
   performing a logical operation of the control data of the control/monitor data stored in the RAM, using a program in a ROM, and transmits a signal to the motor driver to control the motor driver, the ROM being provided in each of the plurality of data processing slave stations.

15. The conveyance control method according to claim 12, wherein the monitor data stored in the RAM includes states of sensors provided to the plurality of data processing slave stations, and
   the control data stored in the RAM at least indicates whether or not operations of the motor drivers provided to the plurality of data processing slave stations are possible.

16. The conveyance control method according to claim 11, wherein the control/monitor data includes the plurality of control data and monitor data about each processing within a single clock cycle.

* * * * *